(No Model.)

P. H. BRIDENBAUGH & L. A. OELLIG.
SPRING TOOTH HARROW OR CULTIVATOR.

No. 429,500. Patented June 3, 1890.

Witnesses:
E. P. Ellen
A. Stevens Pattison

Inventor:
P. H. Bridenbaugh,
L. A. Oellig,
per F. A. Schmann,
atty.

UNITED STATES PATENT OFFICE.

PHILIP H. BRIDENBAUGH AND LEWIS A. OELLIG, OF MARTINSBURG, PENNSYLVANIA.

SPRING-TOOTH HARROW AND CULTIVATOR.

SPECIFICATION forming part of Letters Patent No. 429,500, dated June 3, 1890.

Application filed October 1, 1889. Serial No. 325,718. (No model.)

*To all whom it may concern:*

Be it known that we, PHILIP H. BRIDENBAUGH and LEWIS A. OELLIG, of Martinsburg, in the county of Blair and State of Pennsylvania, have invented certain new and useful Improvements in Spring-Tooth Harrows and Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in spring-tooth harrows and cultivators; and the objects of our invention are to so construct the hinges which unite the two cultivators together that one can be turned back upon the top of the other; to provide each of the frames with pivoted bent runners which regulate the distance that the points of the teeth shall enter the earth; to connect the cultivator-frames together when they are to be used as harrows and provide each one with a draft-link near its inner edge, so that the inner edges of the frames will not sink down, and to secure the pipes through which the supporting rollers or casters pass between the two parts of the frame, so as to hold the pipe rigidly in a vertical position.

Figure 1:
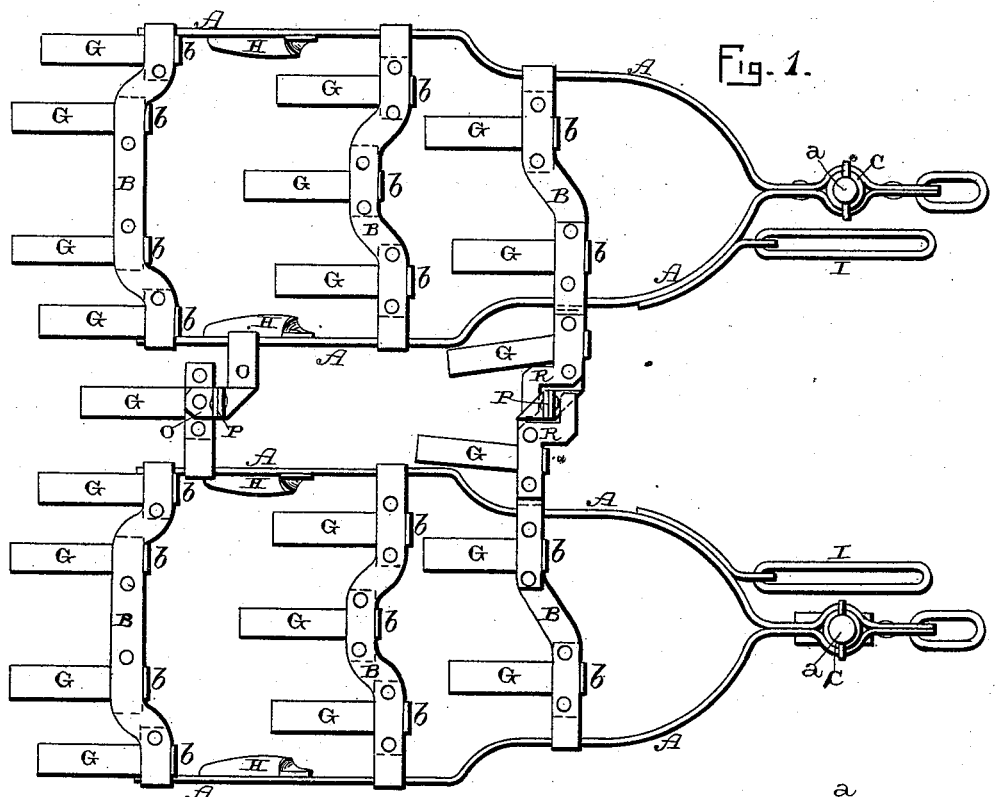
Figure 2:
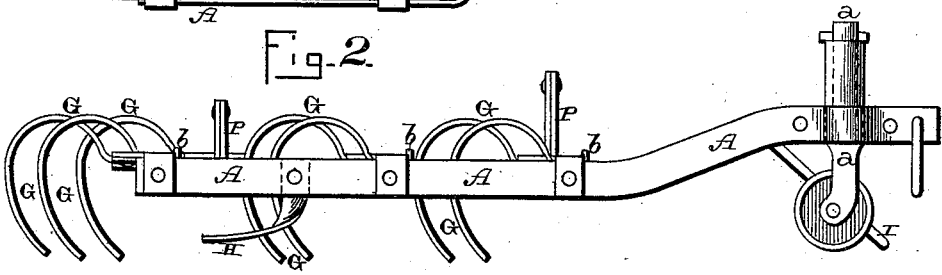
Figure 3:
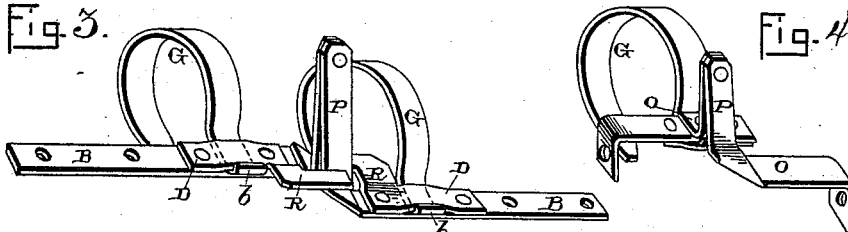
Figure 4:
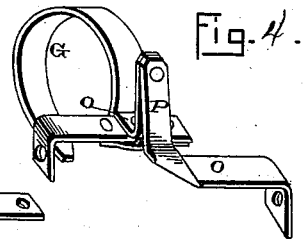
Figure 5:
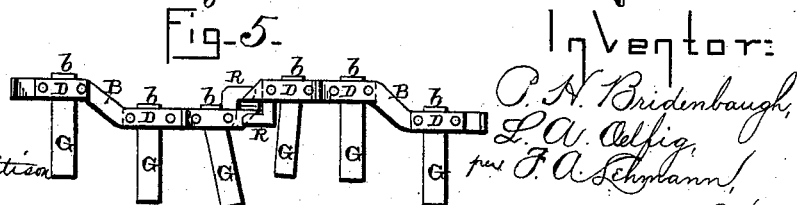

Figure 1 is a plan view of an implement which embodies our invention. Fig. 2 is a side elevation of the same. Figs. 3 and 4 are perspectives of the hinges by which the two cultivators are connected together so as to form a harrow. Fig. 5 is a detail view.

A represents the two side bars of each cultivator-frame, and which are bent upward at their front ends and then made to extend horizontally forward any desired distance. These side bars A are bolted together at their front ends and connected in the rear of their front ends by the cross-bars B. Between the two front ends of the side bars A is placed a vertical pipe C, through which the stem $a$ of the caster-wheel passes, and then the two ends of the side bars are bolted rigidly together, one bolt passing through in front and the other in the rear of the lower end of the pipe. By means of this construction the pipe is held rigidly in position and forms a rigid support for the stem of the caster-wheel. If the pipe is not secured in the manner shown, it is apt to work loose, and then forms a very poor support for the wheel.

The cross-bars B extend from one side of the frame A to the other and have their ends turned downward and bolted to the side pieces, as shown. To the under side of these cross-bars B are bolted a number of short strips D, one strip being used to secure each spring-tooth in position. The spring-teeth G are preferably made of the shape shown, and have their front ends made to extend horizontally forward under the cross-bars B, and then the extreme front end $b$ of each tooth is turned up in front of the front edge of the cross-bar, as shown. Each of the teeth being held in position by a short clamping-piece applied to the under side of the cross-bar, any one of the teeth can be removed at any time without having to disturb any other one, and the shape of the teeth here shown enables each spring-tooth to be made from a single piece of metal. In order to regulate the distance the points of the teeth shall enter the ground, there is pivoted near the inner end of each frame a bent strip H, which forms a runner to support the rear ends of the frames as well as regulate the distance the points of the teeth shall enter the ground. These pivoted runners are so shaped in being bent that they strike against the inside of the side pieces A, and thus regulate the distance the frame shall sink downward.

When it is desired to form a harrow, two of the cultivator-frames are connected together, as shown, and then in order to prevent the inner edges of the frames from dropping downward, as they otherwise would, the draft-loops I are secured to the inner edges of the frame, as shown, and these loops receive the whole of the draft. By means of these loops the inner edges of the frame are made to run as level as the outer edges, whereas if these loops are not used the inner edges of the frames sink downward and the outer edges rise to such an extent that the frames cannot be used to advantage for harrowing.

The hinges by means of which the two frames are secured together are formed from separate pieces of metal O, which are secured either upon the tops of the cross-bars B or to the side bars A, and these pieces of metal have their inner edges turned upward, as shown at P, and through these inner ends the pivotal bolts are passed. These upturned ends P are made to extend upward sufficiently far to allow either one of the frames to be turned over upon the top of the other in order to prevent the frames from getting out of line with each other. To each one of the parts of the front hinges are secured the L-shaped pieces R, which catch upon the opposite sides of the upturned ends P, and thus brace them rigidly in position and at the same time prevent any lateral or twisting strain from coming upon the pivotal bolts which unite the ends P together. To these hinges are secured cultivator-teeth, which are set staggering in relation to each other and which harrow the ground in between the two frames. The rear coupler has the spring-tooth fastened to one-half of coupler directly underneath the joint or hinge, by which means the harrow is jointed evenly in the center.

It is absolutely necessary where two or more frames are connected together, as here shown, that one of the frames should be turned freely back upon the other, as when passing to and from the field, and in order to do this the hinges must be made to extend a suitable distance above the tops of the frames, so that when one frame is turned up it can sweep through a sufficiently large circle to prevent one part interfering with the other.

Having thus described our invention, we claim—

The combination, with the hinged pieces having their inner ends P made to extend upward, of the L-shaped pieces R, secured to the hinged pieces and made to catch upon opposite sides thereof, substantially as described.

In testimony whereof we affix our signatures in presence of two witnesses.

PHILIP H. BRIDENBAUGH.
LEWIS A. OELLIG.

Witnesses:
W. N. KNEI,
D. L. KEAGY.